(12) United States Patent
Eskins

(10) Patent No.: US 11,871,759 B1
(45) Date of Patent: Jan. 16, 2024

(54) SHELLFISH RINSING SYSTEM

(71) Applicant: Matthew Eskins, Metairie, LA (US)

(72) Inventor: Matthew Eskins, Metairie, LA (US)

( * ) Notice: Subject to any disclaimer, the term of this patent is extended or adjusted under 35 U.S.C. 154(b) by 113 days.

(21) Appl. No.: 17/688,986

(22) Filed: Mar. 8, 2022

(51) Int. Cl.
  *A22C 29/00* (2006.01)
  *A22C 29/02* (2006.01)

(52) U.S. Cl.
  CPC .................. *A22C 29/021* (2013.01)

(58) Field of Classification Search
  CPC ........... A22C 29/021; B08B 3/02; B08B 3/04; B08B 3/10; A01K 97/04
  USPC ........................................ 452/1, 6
  See application file for complete search history.

(56) References Cited

U.S. PATENT DOCUMENTS

| | | | |
|---|---|---|---|
| 4,513,525 A | 4/1985 | Ward | |
| 5,501,241 A | 3/1996 | Jacobson | |
| 5,927,304 A | 7/1999 | Wen | |
| D891,178 S | 7/2020 | Lu | |
| 2002/0020104 A1 | 2/2002 | Kolar | |
| 2004/0007258 A1 | 1/2004 | Lasker | |
| 2011/0319002 A1* | 12/2011 | Myers | A22C 29/043 452/6 |
| 2022/0386633 A1* | 12/2022 | McDonald | A22C 29/021 |

FOREIGN PATENT DOCUMENTS

WO       1998005438       2/1998

* cited by examiner

*Primary Examiner* — Richard T Price, Jr.
(74) *Attorney, Agent, or Firm* — Kyle A. Fletcher, Esq.

(57) ABSTRACT

The shellfish rinsing system includes a tub and a basket. The shellfish rinsing system may be operable to clean shellfish and to separate the shellfish from contaminants. The shellfish may be placed into the basket and the basket may be agitated within the tub while water flows through the basket and the tub, carrying away the contaminants. After dumping the contaminants from the tub, the shellfish may be rinsed by allowing the water to flow through the basket and the tub. The basket may be adapted to prevent the shellfish from exiting from the basket.

18 Claims, 7 Drawing Sheets

SHELLFISH RINSING SYSTEM

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of food cleaning accessories, more specifically, a shellfish rinsing system.

SUMMARY OF INVENTION

The shellfish rinsing system comprises a tub and a basket. The shellfish rinsing system may be operable to clean shellfish and to separate the shellfish from contaminants. The shellfish may be placed into the basket and the basket may be agitated within the tub while water flows through the basket and the tub, carrying away the contaminants. After dumping the contaminants from the tub, the shellfish may be rinsed by allowing the water to flow through the basket and the tub. The basket may be adapted to prevent the shellfish from exiting from the basket. As non-limiting examples, the shellfish may comprise crawfish, clams, oysters, crabs, mussels, and scallops. The shellfish rinsing system may also be operable to clean produce. As non-limiting examples, the produce may comprise potatoes, yams, beets, carrots, turnips, peanuts, and other root and tuber crops.

An object of the invention is to clean food items, non-limiting examples of which include shellfish and produce.

Another object of the invention is to provide a tub with a recessed edge, a horizontally oriented lip align with the recess edge, and a hose holder.

Yet another object of the invention is to provide a basket that comprises an unperforated side wall above the height of the lip on the tub.

These together with additional objects, features and advantages of the shellfish rinsing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the shellfish rinsing system in detail, it is to be understood that the shellfish rinsing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shellfish rinsing system.

It is therefore important that the claims be regarded as including such equivalent construction insofar as they do not depart from the spirit and scope of the shellfish rinsing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
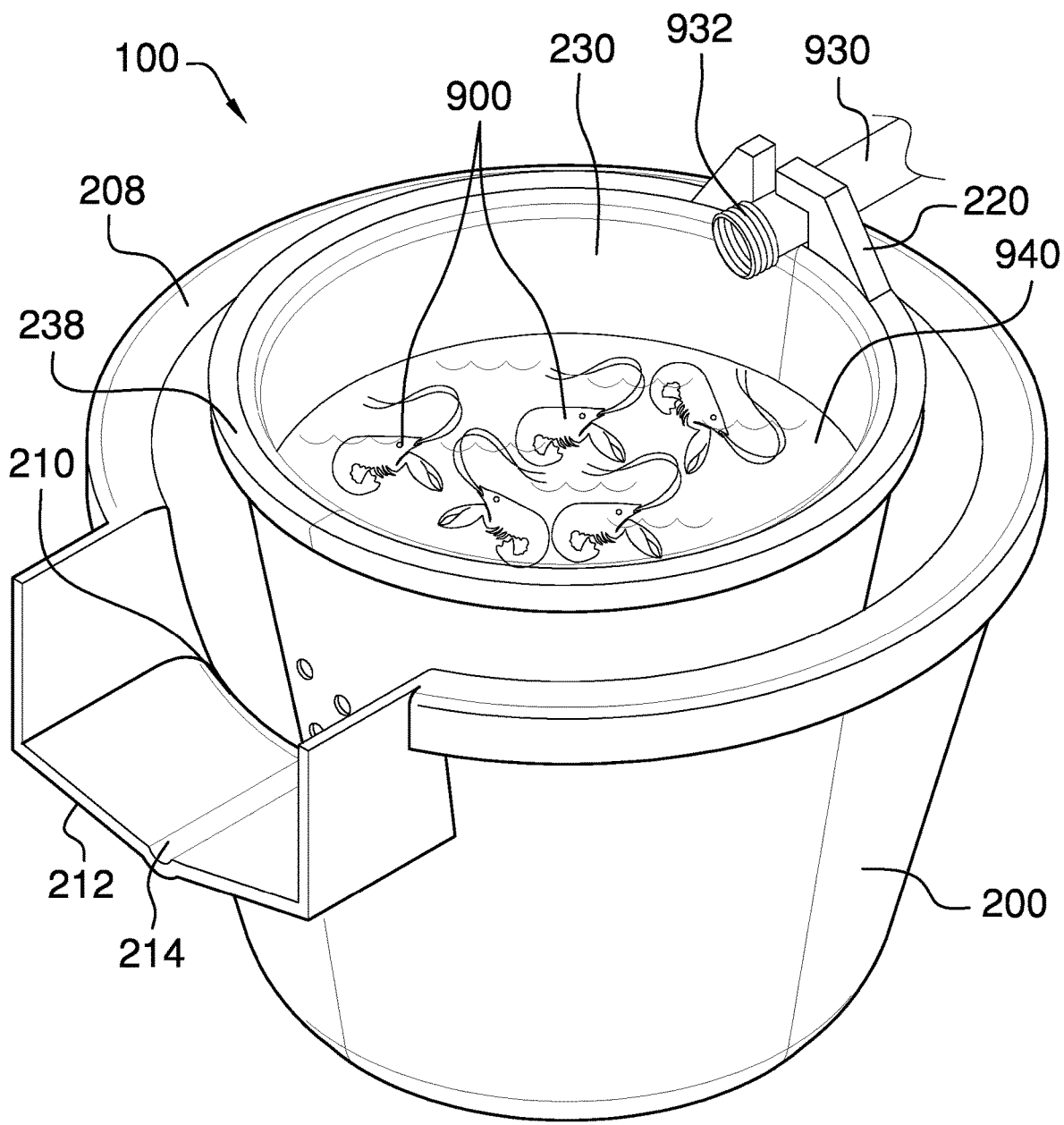
FIG. 1 is an isometric view of an embodiment of the disclosure.
Figure 2:
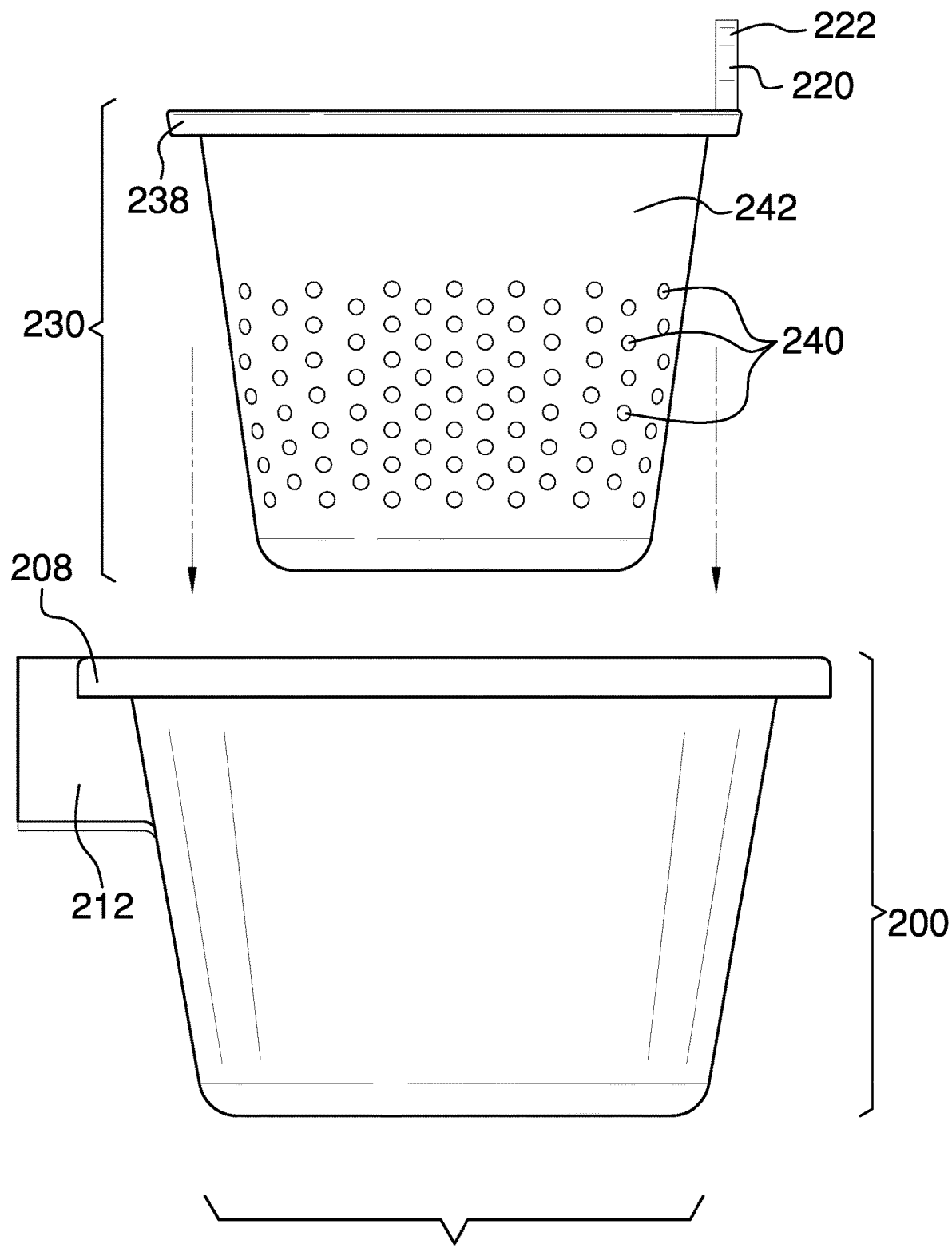
FIG. 2 is a side exploded view of an embodiment of the disclosure.
Figure 3:
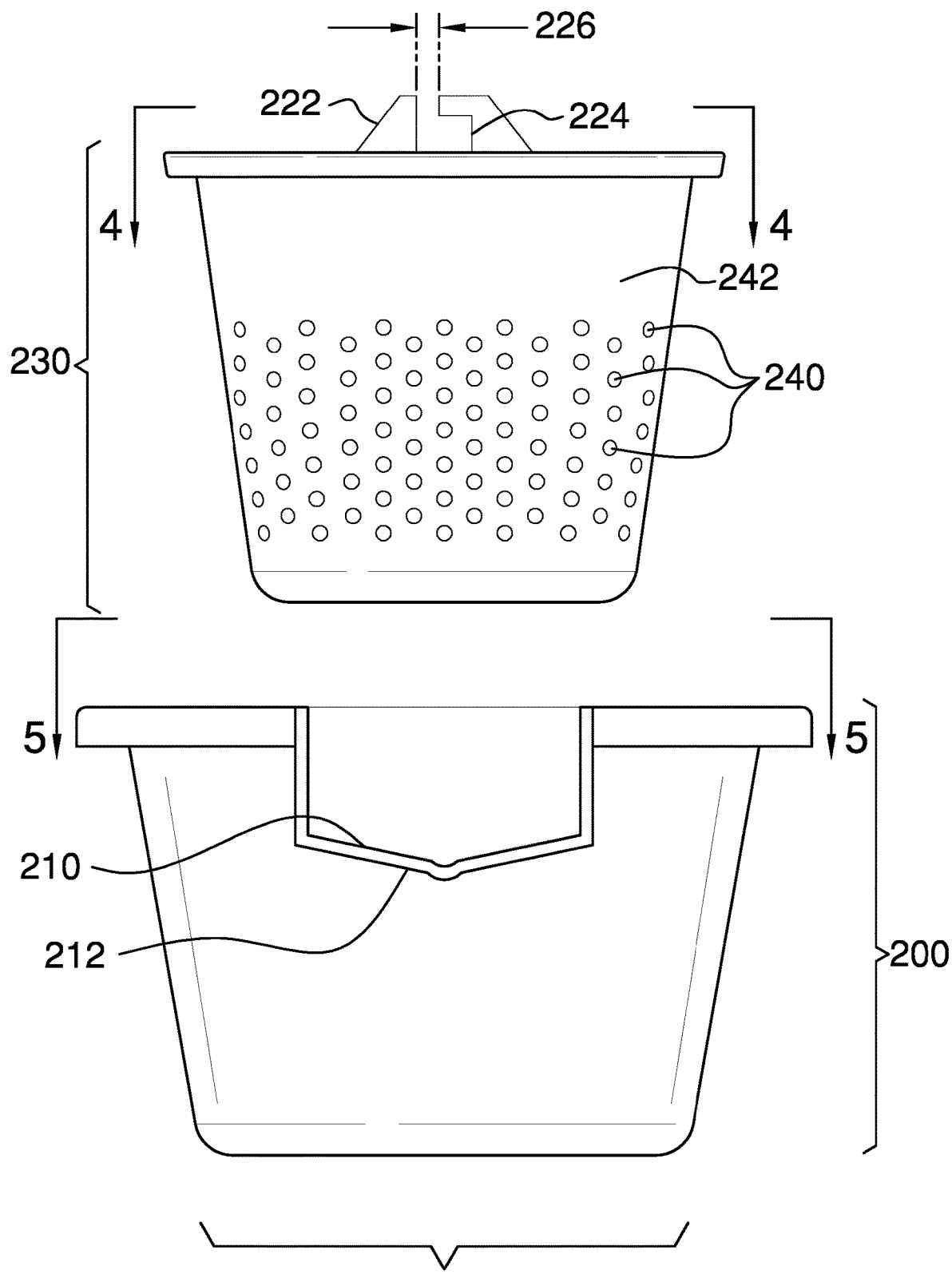
FIG. 3 is a front exploded view of an embodiment of the disclosure.
Figure 4:
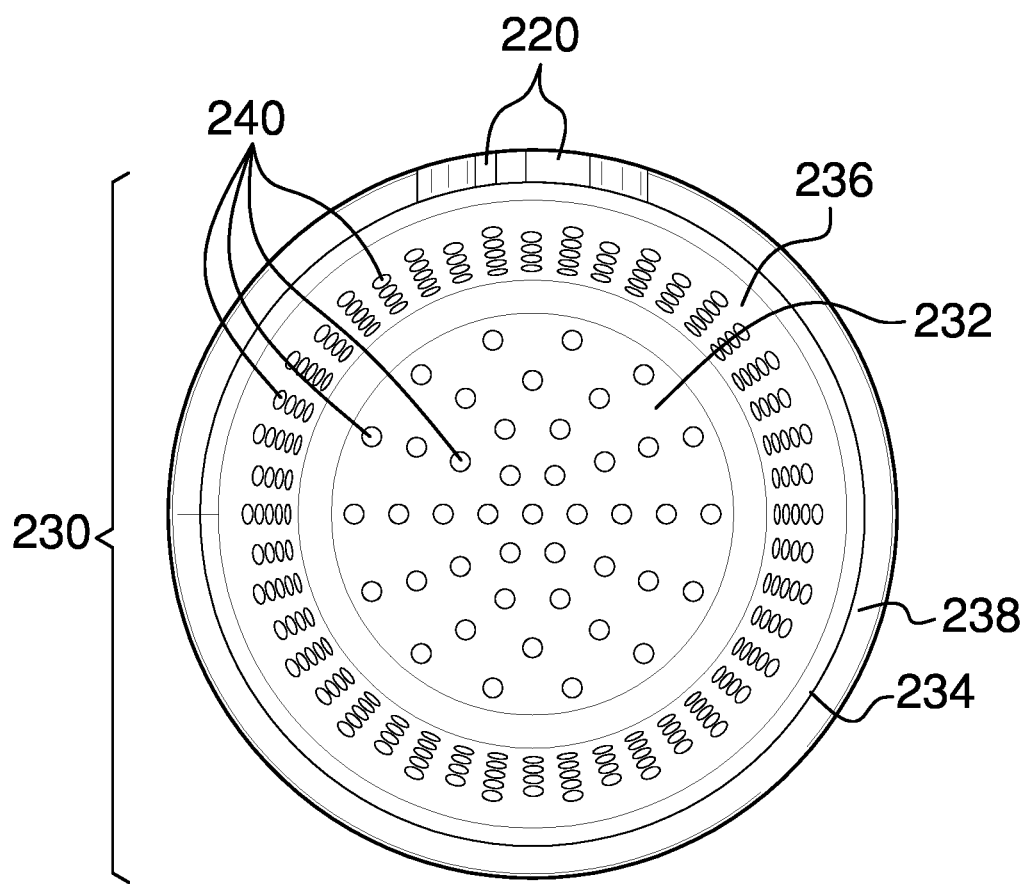
FIG. 4 is a top view of an embodiment of the disclosure illustrating the basket only.
Figure 5:
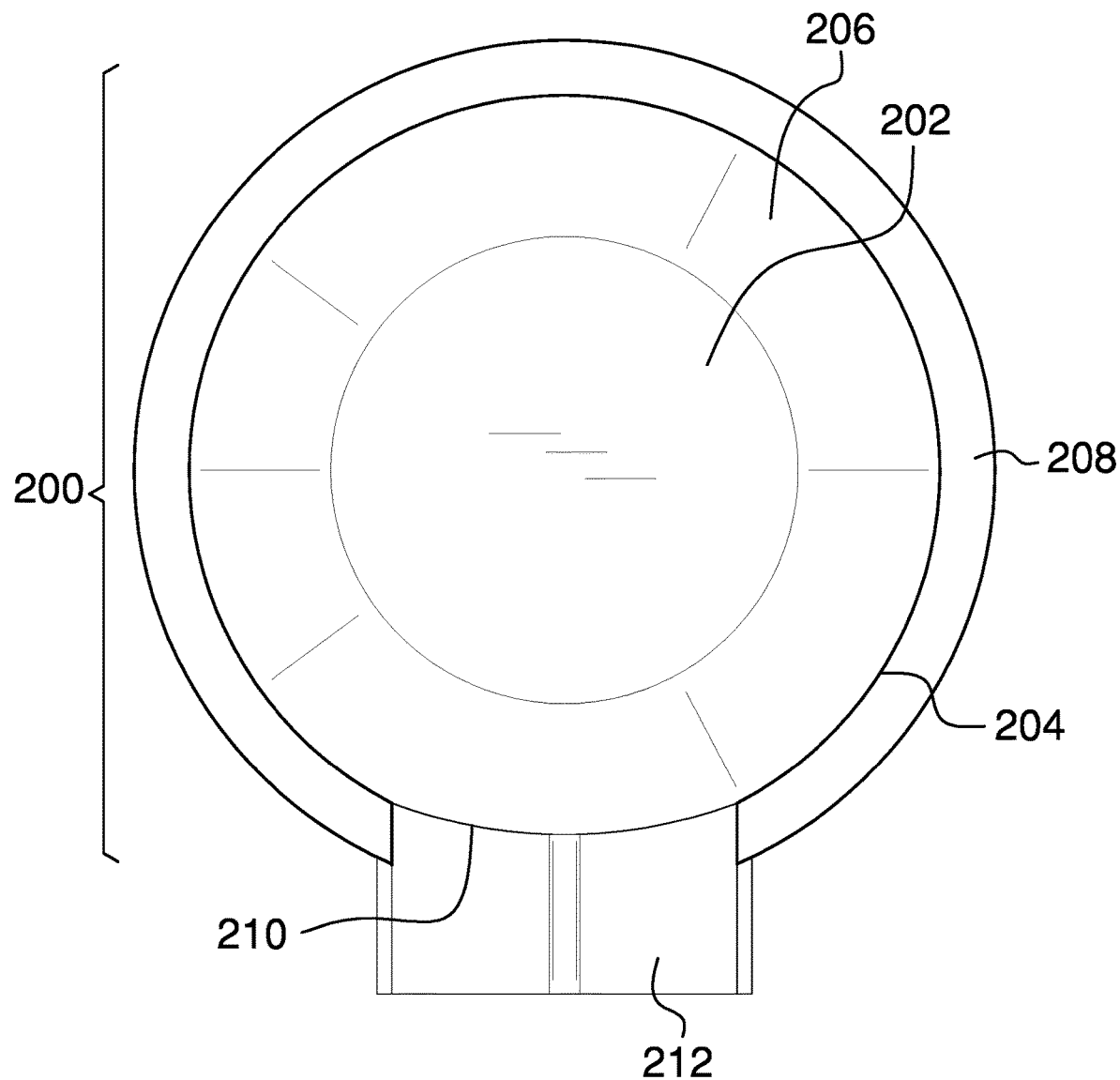
FIG. 5 is a top view of an embodiment of the disclosure illustrating the tub only.
Figure 6:
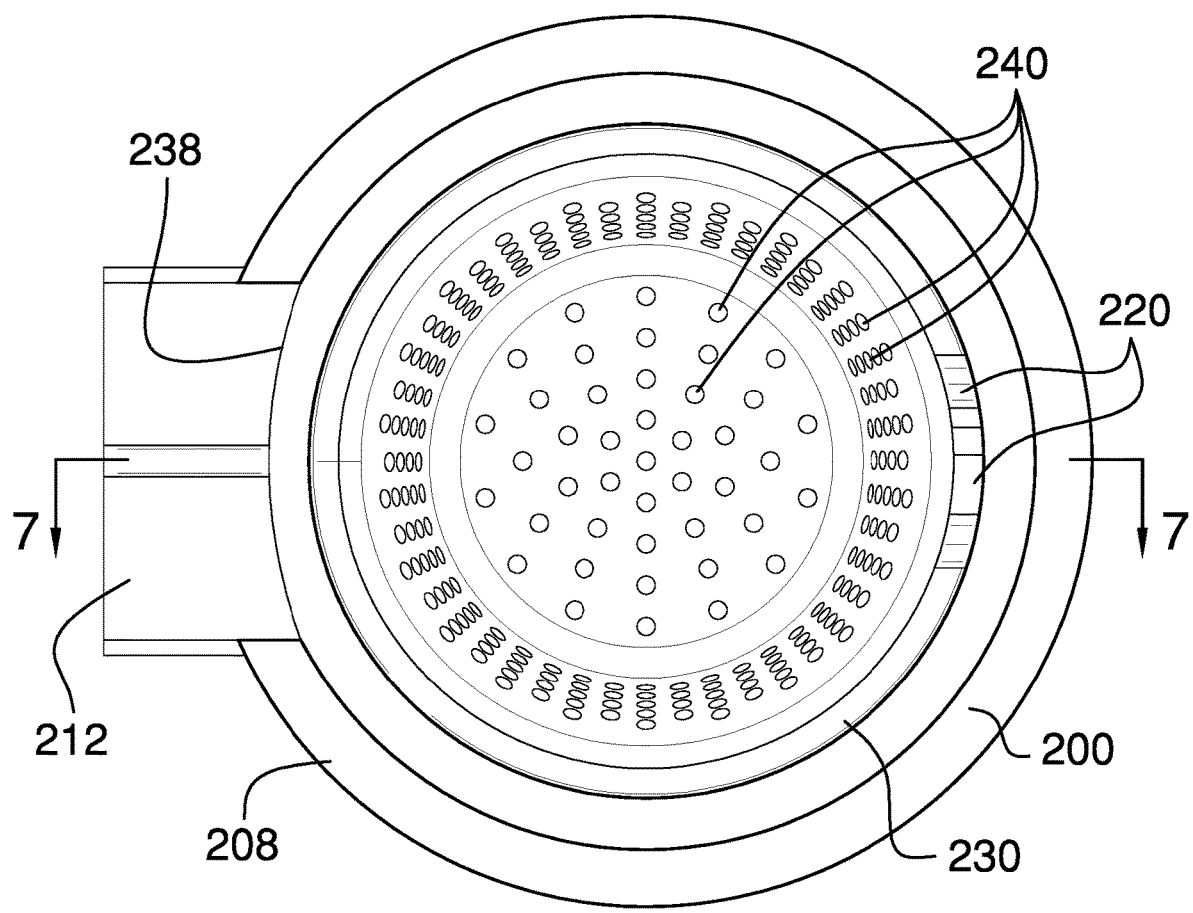
FIG. 6 is a top view of an embodiment of the disclosure.
Figure 7:
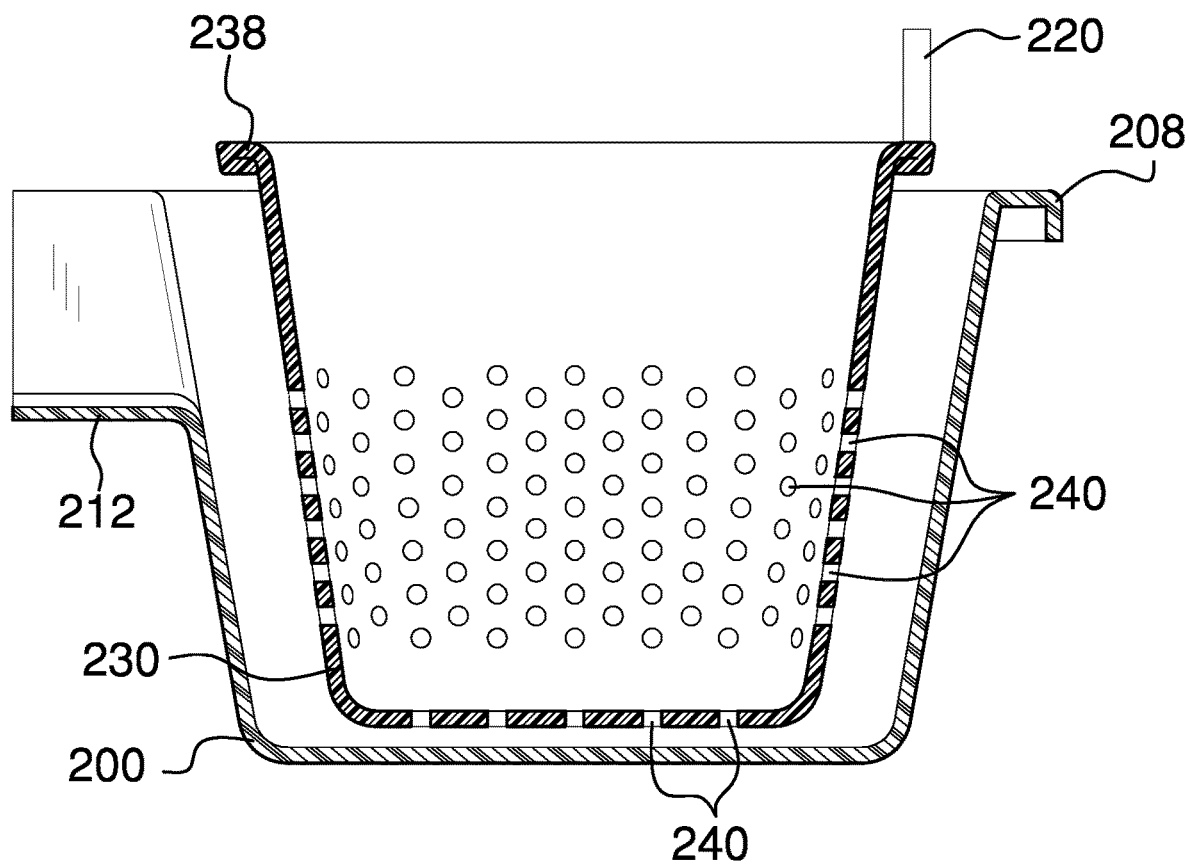
FIG. 7 is a cross-sectional view of an embodiment of the disclosure across 7-7 as shown in FIG. 6.

Detailed reference will now be made to a first potential embodiment of the disclosure, which is illustrated in FIGS. 1 through 7.

The shellfish rinsing system 100 (hereinafter invention) comprises a tub 200 and a basket 230. The invention 100 may be operable to clean shellfish 900 and to separate the shellfish from contaminants. The shellfish 900 may be placed into the basket 230 and the basket 230 may be agitated within the tub 200 while water 940 flows through the basket 230 and the tub 200, carrying away the contaminants. After dumping the contaminants from the tub 200, the shellfish 900 may be rinsed by allowing the water 940 to flow through the basket 230 and the tub 200. The basket 230 may be adapted to prevent the shellfish 900 from exiting from the basket 230. As non-limiting examples, the shellfish 900 may comprise crawfish, clams, oysters, crabs, mussels, and scallops. The invention 100 may also be operable to clean produce. As non-limiting examples, the produce may comprise potatoes, yams, beets, carrots, turnips, peanuts, and other root and tuber crops. As non-limiting examples, the contaminants may comprise dirt, mud, sand, old bait, leaves, and dead shellfish.

The tub 200 may comprise a tub side wall 206 and a tub bottom wall 202. The tub side wall 206 may form a tapered cylinder with the bottom of the tub 200 narrower than the top of the tub 200. The bottom of the tub side wall 206 may be coupled to the tub bottom wall 202 to form a hollow, watertight container for holding the water 940. The tub 200 may be open at a tub top aperture 204. The tub 200 may comprise a tub top brim 208 surrounding the tub top aperture 204. The tub top brim 208 may be a widening of the top of the tub side wall 206. In a preferred embodiment, the tub 200 may have a capacity of 20 gallons+/−5 gallons.

The tub side wall 206 may comprise a recessed edge 210. The recessed edge 210 may be a portion of the top of the tub side wall 206 that is lower than the remainder of the tub side wall 206. The recessed edge 210 may be horizontally-oriented such that the water 940 may begin to flow out through the recessed edge 210 when the water 940 fills the tub 200 to the height of the recessed edge 210. In a preferred embodiment, the recessed edge 210 may comprise between ¼ and ⅛ of the perimeter of the tub 200. The depth of the recessed edge 210 may cause a reduction of the tub capacity to 15 gallons+/−1 gallon. Stated another way, the water 940 may begin to spill out of the tub 200 via the recessed edge 210 when 15 gallons+/−1 gallon of the water 940 have been placed into the tub 200.

The tub side wall 206 may comprise a lip 212. The lip 212 may project horizontally away from the tub side wall 206 at the level of the recessed edge 210. The lip 212 may direct the water 940 flowing out through the recessed edge 210 away from the tub 200. As a non-limiting example, the lip 212 may direct the water 940 flowing out of the tub 200 towards a sink or a drain that may be located adjacent to the tub 200. In some embodiments, the lip 212 may comprise a crease 214 with the center of the lip 212 lower than the sides of the lip 212 such that the water 940 flowing out of the tub 200 over the lip 212 tends to flow at the center of the lip 212. The crease 214 may be oriented radially with respect to the center of the tub 200. In a preferred embodiment, the lip 212 may project away from the tub side wall 206 for a distance of 1.5 inches to 3.5 inches.

The basket 230 may comprise a basket side wall 236 and a basket bottom wall 232. The basket side wall 236 may form a tapered cylinder with the bottom of the basket 230 narrower than the top of the basket 230. The bottom of the basket side wall 236 may be coupled to the basket bottom wall 232 to form a hollow container for holding the shellfish 900. The basket 230 may be open at a basket top aperture 234. The basket 230 may comprise a basket top brim 238 surrounding the basket top aperture 234. The basket top brim 238 may be a widening of the top of the basket side wall 236. The basket 230 may be smaller than the tub 200 and the basket 230 may fit inside the tub 200 such that the basket 230 may rest within the tub 200 surrounded by the tub side wall 206.

The basket 230 may comprise a hose holder 220. The hose holder 220 may be a tab 222 with an L-shaped notch 224 projecting upwards from the basket top brim 238. A width 226 of the L-shaped notch 224 may match the diameter of a hose 930 that will be held by the hose holder 220. The hose 930 may be pushed down into the L-shaped notch 224 and then pressed to the side such that the hose 930 may be retained by the hose holder 220. As a non-limiting example, the hose 930 may be a garden hose. The width 226 of the L-shaped notch 224 may be smaller than the diameter of a fitting 932 that is located at the end of the hose 930 such that the hose 930 may not pull out of the L-shaped notch 224.

The basket side wall 236 may comprise a plurality of apertures 240 that may be dispersed over the basket bottom wall 232 and the basket side wall 236. The plurality of apertures 240 on the basket side wall 236 may rise up to a height that matches the height of the recessed edge 210 such that when the basket 230 is at rest within the tub 200 all of the plurality of apertures 240 are below the level of the recessed edge 210. The plurality of apertures 240 may be smaller than the shellfish 900 that are to be cleaned such that the shellfish 900 may not pass through the plurality of apertures 240. The basket side wall 236 may comprise an unperforated side wall 242 above the plurality of apertures 240. The shellfish 900 that climb on the basket side wall 236 using the plurality of apertures 240 may be prevented from climbing out of the basket 230 due to the unperforated side wall 242 which the shellfish 900 may not be able to climb.

The invention 100 may be used as follows: The basket 230 may be placed into the tub 200. The hose 930 may be inserted into the hose holder 220 such that the water 940 pours from the hose 930 into the basket 230. The shellfish 900 may be placed into the basket 230. The tub 200 is filled with the water 940 such that the water 940 overflows the tub 200 and spills from the lip 212. The shellfish 900 may be washed by repeatedly lifting the basket 230 and forcing the basket 230 back down into the tub 200 such that the water 940 may be agitated by being forced through the plurality of apertures 240 in the basket 230. As the basket 230 is forced down into the tub 200, the water 940 may rush over the recessed edge 210 and the lip 212, carrying away the contaminants. The basket 230 may be removed from the tub 200 and placed aside while the water 940 is dumped from the tub 200, then the basket 230 may be placed back into the tub 200 and the shellfish 900 may be washed again. The shellfish 900 may finally be rinsed by allowing the water 940 from the hose 930 to run into the basket 230 and out over the lip 212 for at least 10 minutes.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, a "cylinder" may be a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, a "notch" may be an indentation formed in an edge or a cavity or aperture formed within a surface.

As used in this disclosure, a "perimeter" may be one or more curved or straight lines that bound an enclosed area on a plane or surface. The perimeter of a circle is commonly referred to as a circumference.

As used in this disclosure, a "sink" may be a permanently installed water basin that is attached to one or more water sources.

As used in this disclosure, a "tab" may be an extension of an object for the purpose of facilitating the manipulation of the object, identifying the object, or attaching the object to another object.

As used herein, the word "watertight" may refer to a barrier that is impermeable to water.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shellfish rinsing system comprising:
a tub and a basket;
wherein the shellfish rinsing system is operable to clean shellfish and to separate the shellfish from contaminants;
wherein the shellfish are placed into the basket and the basket is agitated within the tub while water flows through the basket and the tub, carrying away the contaminants;
wherein after dumping the contaminants from the tub, the shellfish are rinsed by allowing the water to flow through the basket and the tub;
wherein the basket is adapted to prevent the shellfish from exiting from the basket;
wherein the basket comprises a basket top brim, and a hose holder;
wherein the basket is open at a basket top aperture;
wherein the basket top brim of the basket surrounds the basket top aperture;
wherein the hose holder is a tab with an L-shaped notch projecting upwards from the basket top brim;
wherein a width of the L-shaped notch matches the diameter of a hose that will be held by the hose holder;
wherein the hose is pushed down into the L-shaped notch and then pressed to the side such that the hose is retained by the hose holder.

2. The shellfish rinsing system according to claim 1
wherein the tub comprises a tub side wall and a tub bottom wall;
wherein the tub side wall forms a tapered cylinder with the bottom of the tub narrower than the top of the tub;
wherein the bottom of the tub side wall is coupled to the tub bottom wall to form a hollow, watertight container for holding the water;
wherein the tub is open at a tub top aperture.

3. The shellfish rinsing system according to claim 2
wherein the tub comprises a tub top brim surrounding the tub top aperture;
wherein the tub top brim is a widening of the top of the tub side wall.

4. The shellfish rinsing system according to claim 3
wherein the tub has a capacity of 20 gallons+/−5 gallons.

5. The shellfish rinsing system according to claim 3
wherein the tub side wall comprises a recessed edge;
wherein the recessed edge is a portion of the top of the tub side wall that is lower than the remainder of the tub side wall;
wherein the recessed edge is horizontally-oriented such that the water begins to flow out through the recessed edge when the water fills the tub to the height of the recessed edge.

6. The shellfish rinsing system according to claim 5
wherein the recessed edge comprises between ¼ and ⅛ of the perimeter of the tub.

7. The shellfish rinsing system according to claim 5
wherein the depth of the recessed edge causes a reduction of the tub capacity to gallons+/−1 gallon.

8. The shellfish rinsing system according to claim 5
wherein the tub side wall comprises a lip;
wherein the lip projects horizontally away from the tub side wall at the level of the recessed edge;
wherein the lip directs the water flowing out through the recessed edge away from the tub.

9. The shellfish rinsing system according to claim 8
wherein the lip comprises a crease with the center of the lip lower than the sides of the lip such that the water flowing out of the tub over the lip tends to flow at the center of the lip;
wherein the crease is oriented radially with respect to the center of the tub.

10. The shellfish rinsing system according to claim 8
wherein the lip projects away from the tub side wall for a distance of 1.5 inches to 3.5 inches.

11. The shellfish rinsing system according to claim 10
wherein the basket comprises a basket side wall and a basket bottom wall;
wherein the basket side wall forms a tapered cylinder with the bottom of the basket narrower than the top of the basket;
wherein the bottom of the basket side wall is coupled to the basket bottom wall to form a hollow container for holding the shellfish.

12. The shellfish rinsing system according to claim 11
wherein the basket top brim is a widening of the top of the basket side wall.

13. The shellfish rinsing system according to claim 12 wherein the basket is smaller than the tub and the basket fits inside the tub such that the basket rests within the tub surrounded by the tub side wall.

14. The shellfish rinsing system according to claim 13 wherein the basket side wall comprises a plurality of apertures that are dispersed over the basket bottom wall and the basket side wall;
wherein the plurality of apertures on the basket side wall rise up to a height that matches the height of the recessed edge such that when the basket is at rest within the tub all of the plurality of apertures are below the level of the recessed edge.

15. The shellfish rinsing system according to claim 14 wherein the plurality of apertures are smaller than the shellfish that are to be cleaned such that the shellfish do not pass through the plurality of apertures.

16. The shellfish rinsing system according to claim 15 wherein the basket side wall comprises an unperforated side wall above the plurality of apertures.

17. The shellfish rinsing system according to claim 16 wherein the width of the L-shaped notch is smaller than the diameter of a fitting that is located at the end of the hose such that the hose does not pull out of the L-shaped notch.

18. The shellfish rinsing system according to claim 17 wherein the basket is placed into the tub;
wherein the hose is inserted into the hose holder such that the water pours from the hose into the basket;
wherein the shellfish are placed into the basket;
wherein the tub is filled with the water such that the water overflows the tub and spills from the lip;
wherein the shellfish are washed by repeatedly lifting the basket and forcing the basket back down into the tub such that the water is agitated by being forced through the plurality of apertures in the basket;
wherein as the basket is forced down into the tub, the water rushes over the recessed edge and the lip, carrying away the contaminants;
wherein the basket is removed from the tub and placed aside while the water is dumped from the tub, then the basket is placed back into the tub and the shellfish are washed again;
wherein the shellfish are rinsed by allowing the water from the hose to run into the basket and out over the lip for at least 10 minutes.

\* \* \* \* \*